United States Patent

Costa

[11] Patent Number: 5,891,239
[45] Date of Patent: Apr. 6, 1999

[54] QUICK-SETTING CEMENT CONTAINING CLINKER BASED ON CALCIUM FLUORO-ALUMINATE MIXED WITH LIME

[75] Inventor: Umberto Costa, Bergamo, Italy

[73] Assignee: Italcement, S.p.A., Bergamo, Italy

[21] Appl. No.: 895,193

[22] Filed: Jul. 16, 1997

[30] Foreign Application Priority Data

Jul. 17, 1996 [IT] Italy .................. MI96A1473

[51] Int. Cl.$^6$ ............... C04B 7/34; C04B 7/345
[52] U.S. Cl. ............ 106/735; 106/734; 106/768; 106/792; 106/765; 106/757; 106/800; 106/819
[58] Field of Search .................. 106/734, 735, 106/768, 792, 800, 815, 757, 819, 765

[56] References Cited

U.S. PATENT DOCUMENTS

| | | | |
|---|---|---|---|
| 3,628,973 | 12/1971 | Greening et al. | |
| 3,782,992 | 1/1974 | Uchikawa et al. | 106/734 |
| 3,819,389 | 6/1974 | Uchikawa et al. | 106/734 |
| 3,860,433 | 1/1975 | Ost et al. | 106/765 |
| 3,864,138 | 2/1975 | Uchikawa et al. | 106/735 |
| 3,883,361 | 5/1975 | Pollitt et al. | 106/735 |
| 4,028,126 | 6/1977 | Mori et al. | 106/768 |
| 4,452,637 | 6/1984 | Suzukawa et al. | 106/768 |
| 5,650,005 | 7/1997 | Kistler | 106/792 |

FOREIGN PATENT DOCUMENTS

| | | |
|---|---|---|
| 2306179 | 10/1976 | France . |
| 2163604 | 7/1972 | Germany . |
| 9003346 | 4/1990 | WIPO . |

OTHER PUBLICATIONS

Abstract (English language)/JP 57,149,852, Abstract (English language)/JP 04,170,345, Abstract (English language), Abstract (English language) (no date).

Abstract (English language), IT 865,436 and IT 988,018 (no date).

*Primary Examiner*—Michael Marcheschi
*Attorney, Agent, or Firm*—Hedman, Gibson & Costigan, P.C.

[57] ABSTRACT

The present invention regards a particularly quick-setting Portland cement clinker containing calcium fluoro-aluminate ($11CaO.7Al_2O_3.CaF_2$) mixed with lime that has not undergone the burning process of the clinker.

21 Claims, No Drawings

5,891,239

QUICK-SETTING CEMENT CONTAINING CLINKER BASED ON CALCIUM FLUORO-ALUMINATE MIXED WITH LIME

SCOPE OF THE INVENTION

The present invention regards a binder clinker of the Portland type presenting particularly quick hardening, and which contains calcium fluoro-aluminate $11CaO.7Al_2O_3.CaF_2$ (hereinafter abbreviated as $C_{11}A_7f$). More in particular, the present invention regards a cementitious binder, where a solid clinker containing calcium fluoro-aluminate is mixed with lime that has not been subjected to the clinker burning process.

In the present text, the following abbreviations are used:
C for CaO; A for $Al_2O_3$; S for $SiO_2$; f for $CaF_2$; F for $Fe_2O_3$; $C_{11}A_7f$ for $11CaO.7Al_2O_3.CaF_2$; $Cl_{12}A_7$ for $12CaO.7Al_2O_3$; $C_3A$ for $3CaO.Al_2O_3$; CA for $CaO.Al_2O_3$; $C_3S$ for $3CaO.SiO_2$; $C_2S$ for $2CaO.SiO_2$; $C_4AF$ for $(2CaO.Fe_2O_3.6CaO.2Al_2O_3.Fe_2O_3)_{ss}$,
where the subscript ss stands for "solid solution"; $C_4A_3S$ for $3CaO.3Al2O_3.CaSO_4$.

STATE OF PRIOR ART

For various types of building operations, such as fast processes for fixing elements in position and repairs carried out on vertical and horizontal surfaces made of concrete and masonry, it proves important to have available cementitious materials that present high setting rates. Examples of such operations regard the laying of street manhole covers, the fixing in place of brackets, plumbing and hinge pintles, the erection of falsework made of wood or metal, the laying of boxes and sheaths for electrical installations, the fixing in place of small wood blocks, sealing of cement mains, sewage drains or cisterns, the stopping of weak infiltrations of water in underground structures, cellars and lift wells.

Further examples of use regard the coating of airport runways, roofings, projecting with mortar or concrete to line tunnels, the coating of embankments or slopes, and for the increase in productivity of plants producing concrete manufactured articles, such as blocks, pipes, panels, beams and upright structural members.

For this reason, modified Portland-type binders have been developed having quicker setting or hardening characteristics than does ordinary Portland cement.

According to the Italian Ministerial Decree of Aug. 31, 1972 "Regulations regarding acceptance standards and testing procedures of cementitious agglomerates and hydraulic limes", quick-setting binders must present start-of-setting times of more than 1 minute, and end-of-setting times of less than 30 minutes, calculated on ordinary paste, and must moreover have a minimum compressive strength at 7 days of at least 12 MPa. Further specifications regard the content of $SO_3$ (lower than 3.5%) and MgO (lower than 4%).

The so-called quick binders are generally characterized by high calcium aluminate content. Among the aluminates, $C_{12}A_7$, and to a lesser extent $C_3A$, hydrate quickly, whilst CA hydrates slowly. The rate of hydration may be modified by the presence of salts or chemical products that have the function of accelerating or retarding hydration.

Various quick binders are obtained by the "clinkerization" of mixtures of minerals or industrial by-products, followed by grinding of the clinker thus obtained and by the addition of additives, such as anhydrite. Various types of clinker are known for fast binders, among which the following may be mentioned:

a) clinker rich in $C_{12}A_7$, the composition of which falls within the compatibility tetrahedroid $C_2S$—$C_{12}A_7$—$C_3A$—$C_4AF$. Cements of this type are sold with the name of Prompt Vicat and are currently considered the best as regards technical characteristics of the cements on the market, at least in Italy;

b) clinker containing fluorinated derivatives of $C_{12}A_7$, the composition of which falls within the compatibility tetrahedron $C_3S$—$C_2S$—$C_{11}A_7f$—$C_4AF$; examples are Regulated Set Cement sold on the U.S. market and the Giesereibinder of Heidelberg;

c) clinker containing calcium aluminumsulphate $C_4A_3S$ and β-$C_2S$. The burning temperature is in this case more critical than that of the clinkers a) and b) because the range of stability of $C_4A_3S$ is rather restricted, i.e., from 1150° C. to 1350° C.;

d) mixture of Portland cement and alumina cement.

The clinkers of type b) lead to products with better characteristics of strength on account of the presence of $C_3S$, and moreover make it possible to recycle alumina-bearing slag which is found at a low cost on the market, incorporating it into the clinker.

The fluoro-aluminate cements were developed by the American researchers of the Cement Portland Association in the early nineteen-seventies (Italian Patents No. 865436 and No. 988018). Subsequently, similar cementitious compositions were developed in Japan and sold as Jet Cement. In this connection, Patent DE 2163604, which claims clinkers containing from 40% to 60% of $C_{11}A_7f$ and from 30% to 50% of $C_3S$, may be recalled.

For the preparation of the binders, to the fluoro-aluminate-based clinkers is added, for example, gypsum in the form of the dihydrate ($CaSO_4 2H_2O$) or anhydrite ($CaSO_4$), as well as other possible constituents of ordinary cements.

TECHNICAL PROBLEM

Clinkers containing fluoro-aluminate may be advantageously used for the preparation of quick-setting binders. However, as may be seen from the results given in Patent DE 2163604, even though the hardening of the binder prepared with $C_{11}A_7f$-based and $C_3S$-based clinkers may occur even after only 15 minutes, to obtain satisfactory values of compressive strength high levels of $C_{11}A_7f$ content equal to at least 40 wt % of the clinker are required. This represents an undoubted disadvantage, given the high incidence on costs of the end product due to the considerable quantity of calcium fluoride needed to prepare the clinker. In addition, the times at which values of compressive strength are observed that can be deemed satisfactory are frequently longer than 1 hour.

Furthermore, even though, on the one hand, the presence of high quantities of $C_3S$ in the clinker contributes to bestowing on the end product high strength, on the other hand, it causes an undesirable delay in setting time.

There has thus been felt the need to have available new types of quick-setting binders that do not present the disadvantages of the known products, and in particular make it possible to cut down the setting times, providing high values of compressive strength as regards both the short times and the long times.

SUMMARY

Now the applicant has unexpectedly found that by adding lime, preferably ground lime, to a clinker containing calcium fluoro-aluminate, a quick binder is obtained which enables increase in the compressive strength of the cementitious compositions obtained from it within 15 minutes, and to achieve setting times ranging from 1 to 3 minutes.

Consequently, the subject of the present invention is a hydraulic binder for cementitious compositions comprising a clinker containing calcium fluoro-aluminate $11CaO.7Al_2O_3.CaF_2$, characterized in that it contains lime added to the clinker after the latter is burnt.

The binder according to the invention is prepared by grinding lime together with the burnt clinker, or by mixing the ground lime to the clinker which has itself previously been ground, according to a procedure which is also a subject of the present invention.

Other subjects of the present invention are represented by the clinker itself, by the dry pre-mixed compositions suitable for preparing mortars and concretes, the corresponding cementitious compositions, and by the their process of preparation.

A further subject of the present invention is a clinker containing:

from 1 to 30% by weight of $11CaO.7Al_2O_3.CaF_2$;
from 24 to 60% by weight of $3CaO.SiO_2$
from 15 to 30% by weight of $2CaO.SiO_2$;
from 4 to 15% by weight of $(2CaO.Fe_2O_3.6CaO.2Al_2O_3.Fe_2O_3)_{ss}$, and
the corresponding preparation procedure.

DETAILED DESCRIPTION

In the present text, the term "binder" refers to a hydraulic cementitious material, powdered when in the dry solid state, which, when it is mixed with water, provides plastic mixtures that are able to set and harden. By "dry pre-mixture" is meant a homogeneous mixture of binder and at least one inert substance, such as sand, and possibly other additives, suitable for being mixed with water and for yielding mortars and concretes.

By the terms "cementitious composition" or "cementitious mixture" is meant any composition in which a binder is mixed with water and possibly with aggregates of various grain sizes. The cementitious compositions therefore include both cementitious "pastes" i.e., mixtures of binder and water, devoid of aggregates and conglomerates i.e., mixtures of water, cement and aggregates.

The "aggregates" or "inert substances" may be coarse aggregates, such as crushed stones or gravel, or fine aggregates, such as sand, and are classified in the UNI 8520 standards.

Examples of conglomerates are mortars (mixtures of binder, water and fine aggregate) and concretes (mixtures of water, binder, fine aggregate and coarse aggregate).

The "clinker" used for the preparation of the binder according to the present invention is any clinker containing calcium fluoro-aluminate [$11CaO.7Al_2O_3.CaF_2$], more in particular also containing the other typical constituents of the clinker of Portland cement, such as halite ($C_3S$), belite ($C_2S$) and calcium aluminoferrite ($C_4AF$).

The lime added to the clinker to obtain the solid binder according to the present invention is quicklime or slaked lime and is preferably quicklime (powdered or in clods).

The present hydraulic binder is prepared by adding the lime (in particular, quicklime in clods) to the clinker and grinding it together with the clinker, possibly in the presence of other additives for cements, until a mixture having the desired fineness is obtained, or by mixing the lime powder (quick or slaked lime), already ground to the desired fineness, with the previously ground clinker, and possibly with other additives for cements, for example, by adding the ground lime to the clinker previously ground with gypsum.

The applicant has in particular unexpectedly found that lime enables cementitious compositions to be obtained which have better compressive strength than do those not containing it.

Generally, the lime is added to the clinker in a quantity of at least 1% by weight, for example, between 1% and 8% by weight of the total solid binder, preferably between 3% and 6% by weight, and, more preferably, 4% by weight of the total solid binder.

In addition to the clinker and the lime, the cementitious binder according to the present invention contains other additives for cements, typically sources of calcium sulphate, which are added to the clinker together with the lime, i.e., by grinding them together with the clinker and the lime, or by adding them in already ground form to the clinker and to the lime, which also have been ground.

The calcium sulphates serve to control the life time, i.e., the time during which the cementitious mixture maintains sufficient workability to make it possible for the mixture itself to be laid before it hardens.

Sources of calcium sulphate are preferably naturally occurring gypsum in the dihydrate form and anhydrite, but also chemical gypsum which is the residue of processes, such as fluogypsum, phosphogypsum or gypsum coming from plants for desulphurization of fluorides, and these are added to the ground clinker in quantities generally ranging from 1% to 6% by weight of the total dry binder, and, more preferably, from 2% to 4% by weight of the total binder.

The total content of sulphates of the binder according to the present invention must preferably meet the regulatory conditions ($SO_3$ content less than 3.5%) and besides depending on the quantity added to the clinker in the form of gypsum or anhydrite, it also depends on the quantity of sulphates contributed by the clinker itself.

Preferably, the lime in clods is ground together with the clinker in the presence of dihydrate gypsum or anhydrite.

The grinding of the clinker, possibly in the presence of lime and/or other additives for cements, is generally carried out using conventional equipment, such as open-circuit or closed-circuit horizontal ball mills and/or roller mills.

The thermal conditions of grinding and mixing are the typical ones that are employed in the preparation of ordinary cements.

The fineness to which the mixture of the components of the solid cementitious binder according to the present invention is ground, or else the fineness that its individual constituents must have, corresponds to typical values for cements and is generally between 2500 and 7000 Blaine, preferably between 3500 and 4500 Blaine ($cm^2/g$).

The grinding (refining) of the burnt clinker, possibly combined with its additives, requires different times, which vary according to the characteristics of the crushing and grinding systems adopted, and with laboratory mills the times are between 10 and 60 minutes, more preferably between 30 and 40 minutes.

Preferably the clinker includes:

from 12 to 18% by weight of $11CaO.7Al_2O_3.CaF_2$;
from 40 to 45% by weight of $3CaO.SiO_2$;
from 25 to 30% by weight of $2CaO.SiO_2$;

from 6 to 8% by weight of $(2CaO.Fe_2O_3.6CaO.2Al_2O_3.Fe_2O_3)_{ss}$.

The composition data given above refer to the following potential calculation scheme:

$$C_4AF = 3.04\, Fe_2O_3$$

$$C_{11}A_7f = \frac{Al_2O_3 - (C_4AF \times 0.2098)}{0.5066}$$

$$CaO_{res} = CaO_{tot} - 0.4616\, C_4AF - 0.4379\, C_{11}A_7F - CaO_{fr} - 0.7 SO_3$$

$$C_3S = 4.07\, CaO_{res} - 7.6\, SiO_2$$

$$C_2S = 8.6\, SiO_2 - 3.07\, CaO_{res}$$

where res=residual; fr=free; tot=total.

The clinker for preparation of the binder according to the present invention is typically obtained by burning ("clinkerization") a mixture containing at least one source of lime, at least one source of alumina, at least one source of iron, at least one source of fluoride, and at least one source of silica.

Among the sources of alumina, may be mentioned bauxite, which has a typical alumina content of approximately 60–90% or residual slag from aluminium metallurgical processes. Typical sources of lime are marls or limestones, having, for example, a CaO content of around 35–55%.

Among the sources of fluoride, fluorites and the so-called "fluorspar biscuits" with a content of $CaF_2$ of from 40 to 60% may be mentioned.

Among the sources of silica, marls or siliceous clays and sands may be mentioned.

The mixture of raw materials for undergoing "clinkerization" typically has an $Al_2O_3$ content of between 5% and 10% by weight, a CaO content of between 35% and 45% by weight. In addition, it may have a $SiO_2$ content of between 10% and 15% by weight.

In general, clinkers with $Fe_2O_3$ content of less than 3% by weight are to be preferred.

The materials that are to undergo "clinkerization", preferably in a finely ground form, are mixed together to form a homogeneous mixture and burnt in conventional furnaces.

A preferred alternative for the preparation of the clinker of the invention consists of adding the appropriate quantities of bauxite and fluorite to a conventional flour for Portland clinker.

The burning of the clinker is generally carried out at temperatures ranging between 1275° C. and 1400° C., preferably between 1300° C. and 1350° C.

The burnt clinker may contain variable limited quantities of free calcium oxide (CaO) resulting from incomplete transformation of the raw materials used for its preparation. The lime that has undergone calcining, in particular at a temperature over 850°–900° C., is modified becoming "over-roasted" or "overburnt" lime, which is not very reactive, and in the process of slaking with water, which occurs during the preparation of cementitious compositions, it is hydrated slowly. Added to this is the fact that it is a cause of instability for cements.

The lime added to the clinker for the preparation of the solid binder according to the present invention is "crude" lime; i.e., it has not undergone the clinkerization process. For this reason, it is different from "overburnt" lime and bestows on the binder according to the present invention advantageous properties in terms of compressive strength and setting time, which are not provided by "overburnt" lime. Consequently, the lime added to the clinker after burning is clearly distinguished from the lime present in the binder and that derives from the clinker.

The clinker may, however, be obtained also with other methods similar to the ones already known to the prior art.

Preferably, the hydraulic binder according to the present invention contains approximately from 80% to 98% by weight of the aforesaid clinker, and consequently contains preferably from 1% to 30% by weight of calcium fluoroaluminate, and more in particular:

from 1% to 30% by weight, more preferably from 10% to 18% by weight, of $11CaO.7Al_2O_3.CaF_2$;

from 24% to 60% by weight, more preferably from 32% to 45% by weight, of $3CaO.SiO_2$;

from 15% to 30% by weight, more preferably from 20% to 30% by weight, of $2CaO.SiO_2$;

from 4% to 15% by weight, more preferably from 5% to 8% by weight, of $(2CaO.Fe_2O_3.6CaO.2Al2O_3Fe_2O_3)_{ss}$; the weight % referring to the weight of the binder.

The total quantity of free CaO contained in the present hydraulic binder is typically between 1% and 10% by weight, preferably between 3% and 6% by weight, of the total solid binder, and depends not only on that added to the burnt clinker, but also on that contributed by the clinker itself, which is generally limited, and normally does not exceed 2.5% by weight of the clinker.

Furthermore, the amount of $Fe_2O_3$ in the binder is comprised between 0.5% and 3% by weight of the total binder.

The cementitious solid binder, according to the present invention, is used for the preparation of cementitious compositions comprising the binder, water and, optionally, aggregates i.e. cementitious "pastes", mortars and conglomerates, obtainable by mixing said binder with water and optionally with aggregates.

Cementitious compositions such as mortars and concretes obtained with the binder object of the present invention are a further object and are, in particular, mortars having a binders/aggregates weight ratio comprised between 2/1 and 3/1 and concretes having a binders/aggregates weight ratio comprised between 1/3 and 1/6.

The amount of water used in the cementitious compositions is sufficient to complete the binder hydrating reaction and to gain the best workability of the mixture. The ratio of water, binder and optionally aggregates of the cementitious compositions according to the present invention can vary among wide limits and is a characteristic of the properties and final purposes of mortars and desired concretes. In general terms the water amount is comprised between 20 and 40% by weight in comparison with the binder weight.

The mixing methodology may be any one of the conventional methodologies.

The temperature at which the binder, and possibly the aggregates, are mixed with water is generally between +5° and +30° C., and preferably at least 20° C.

Some particular embodiments of the present invention are given hereinafter to provide illustrative examples, which, however, do not exhaust the possibilities.

Compressive strength was determined by converting the binder of the present invention into mortar, with weight ratios of binder/sand of 2:1 and weight ratios of water/binder of between approximately 0.25 and 0.4. The mortar then shaped to form prisms having the dimensions of 4×3×16 cm, and compressive strength was measured according to the UNI EN 196.1, with the sole difference that the standard envisages binder/sand ratios of 1:3.

EXAMPLE A

General Mode of Preparation of Clinker

Burning of the clinker was carried out in a rotary kiln having a diameter of approximately 80 cm and a length of 5 m.

The kiln was fettled with monolithic lining, equipped with a methane gas burner supplied with oxygen, and able to reach in the burning region temperatures of up to 1700°–1800° C. The system was one with natural-draught.

The hot gases coming out of the kiln pass through a chamber made of brickwork, above which is located a hopper made of perforated plate containing the granulated flour. The gases thus preheat the flour and at the same time undergo a certain degree of dedusting.

The furnace is fed through a duct having a rectangular section.

The adjustments that were possible regarded the speed of rotation (from 30 to 90 rev/sec) and the flow of methane.

The temperature of the material being burnt was detected with a MINOLTA high-precision optical pyrometer.

The clinker discharged from the furnace fell onto a metal chute, which supplied a small bucket elevator for depositing the clinker in a collecting container.

Given the limited flow of material, the cooling of the clinker by mere exposure to air was rather fast.

The burning test was carried out in a way that was broadly satisfactory since it was possible to maintain conditions of stability of burning for quite long periods of time.

Altogether, approximately 300 kg of clinker were obtained in a period of 4 hours.

The clinkerization temperature, detected by means of the pyrometer, was between 1330° C. and 1350° C.

The free lime content remained quite modest throughout the burning process.

According to the procedure outlined above, various clinkers were prepared by mixing together materials containing the appropriate raw materials, as illustrated in the following examples.

EXAMPLE 1

Table 1 shows the chemical compositions of the raw materials used, the composition of the crude mixture converted into clinker, and the composition of the clinker.

TABLE 1

| CHEMICAL COMPOSITION | | LIME-STONE | MARL | ALUMINOUS SLAG | CALCIUM FLUORIDE | CRUDE MIXTURE | CLINKER |
|---|---|---|---|---|---|---|---|
| Loss on ignition | % | 40.70 | 35.06 | 12.48 | | 34.64 | 0.34 |
| $SiO_2$ | % | 4.73 | 15.24 | 11.20 | | 13.53 | 20.39 |
| $AL_2O_3$ | % | 1.57 | 3.48 | 62.50 | | 6.4 | 9.647 |
| $Fe_2O_3$ | % | 0.98 | 1.73 | 4.04 | | 1.75 | 2.64 |
| CaO | % | 50.35 | 42.17 | 2.80 | | 41.20 | 62.02 |
| MgO | % | 0.62 | 0.85 | 2.56 | | 0.91 | 1.37 |
| $SO_3$ | % | 0.09 | 0.06 | 0.32 | | 0.08 | 0.12 |
| $Na_2O$ | % | 0.17 | 0.10 | 1.12 | | 0.17 | 0.26 |
| $K_2O$ | % | 0.37 | 0.65 | 0.40 | | 0.60 | 0.90 |
| SrO | % | 0.02 | 0.13 | 0.04 | | 0.11 | 0.16 |
| $Mn_2O_3$ | % | 0.03 | 0.08 | 0.20 | | 0.08 | 0.12 |
| $P_2O_5$ | % | 0.01 | 0.15 | 0.04 | | 0.12 | 0.18 |
| $TiO_2$ | % | 0.07 | 0.15 | 0.72 | | 0.17 | 0.26 |
| F | % | | | | 48.67 | | 0.76 |
| FreeCaO | % | | | | | | 0.85 |
| % IN MIXTURE COMPOSITION % | | 14.2 | 79.5 | 5.3 | 1.0 | | |
| $C_3S$ | | | | | | | 50.59 |
| $C_2S$ | | | | | | | 20.31 |
| $C_{11}A_7f$ | | | | | | | 15.71 |
| $C_4AF$ | | | | | | | 8.03 |

% by weight

EXAMPLE 2

Table 2 shows the chemical compositions of the raw materials used, the composition of the crude mixture converted into clinker, and the composition of the clinker.

TABLE 2

| CHEMICAL COMPOSITION | | PORTLAND CLINKER FLOUR | ALUMINOUS SLAG | LIME-STONE | FLUORITE | CRUDE MIXTURE | CLINKER |
|---|---|---|---|---|---|---|---|
| Loss on ignition | % | 35.29 | 7.02 | 43.29 | | 33.89 | 0.46 |
| $SiO_2$ | % | 14.73 | 11.83 | 1.51 | | 13.68 | 20.62 |
| $AL_2O_3$ | % | 3.49 | 69.78 | 0.25 | | 6.67 | 9.87 |
| $Fe_2O_3$ | % | 1.48 | 5.26 | 0.25 | | 1.63 | 2.96 |
| CaO | % | 42.51 | 0.01 | 53.70 | | 41.02 | 61.85 |
| MgO | % | 0.89 | 4.32 | 0.34 | | 1.10 | 1.66 |
| $SO_3$ | % | 0.06 | 0.04 | 0.02 | | 0.12 | 0.27 |
| $Na_2O$ | % | 0.10 | 0.29 | 0.08 | | 0.15 | 0.20 |
| $K_2O$ | % | 0.78 | 0.45 | 0.14 | | 0.73 | 0.75 |
| SrO | % | 0.11 | 0.01 | 0.06 | | 0.11 | 0.15 |
| $Mn_2O_3$ | % | 0.07 | 0.24 | 0.06 | | 0.08 | 0.13 |
| $P_2O_5$ | % | 0.09 | 0.07 | 0.06 | | 0.09 | 0.13 |
| $TiO_2$ | % | 0.11 | 0.63 | 0.01 | | 0.16 | 0.24 |
| F | % | 0.01 | | | 22.87 | 0.42 | 0.76 |
| FreeCaO | % | | | | | | 1.34 |
| % IN MIXTURE COMPOSITION % | | 87.1 | 4.9 | 5.9 | 2.1 | | |
| $C_3S$ | | | | | | | 44.21 |
| $C_2S$ | | | | | | | 28.77 |
| $C_{11}A_7f$ | | | | | | | 15.56 |
| $C_4AF$ | | | | | | | 9.00 |

% by weight

EXAMPLE 3

Table 3 shows the chemical compositions of the raw materials used, the composition of the crude mixture converted into clinker, and the composition of the clinker.

TABLE 3

| CHEMICAL COMPOSITION | | PORTLAND CLINKER FLOUR | BAUXITE + FLUORITE | CRUDE MIXTURE | CLINKER |
|---|---|---|---|---|---|
| Loss on ignition | % | 34.95 | 16.68 | 34.25 | 0.17 |
| $SiO_2$ | % | 13.75 | 10.72 | 13.80 | 21.09 |
| $AL_2O_3$ | % | 4.01 | 39.25 | 6.39 | 9.59 |
| $Fe_2O_3$ | % | 1.51 | 5.60 | 1.71 | 2.53 |
| CaO | % | 42.81 | 18.14 | 40.27 | 61.54 |
| MgO | % | 1.08 | 0.02 | 0.92 | 1.51 |
| $SO_3$ | % | 0.34 | 3.10 | 0.58 | 0.76 |
| $Na_2O$ | % | 0.24 | 0.26 | 0.27 | 0.40 |
| $K_2O$ | % | 0.79 | 0.28 | 0.62 | 0.98 |
| SrO | % | 0.02 | | 0.02 | 0.03 |
| $Mn_2O_3$ | % | 0.04 | | 0.03 | 0.05 |
| $P_2O_5$ | % | 0.14 | | 0.13 | 0.19 |
| $TiO_2$ | % | 0.17 | | 0.29 | 0.44 |
| F | % | 0.01 | 6.4 | 0.45 | 0.74 |
| FreeCaO | % | | | | 0.36 |
| % IN MIXTURE COMPOSITION % | | 93.5 | 6.5 | | |
| $C_3S$ | | | | | 44.04 |
| $C_2S$ | | | | | 27.25 |
| $C_{11}A_7f$ | | | | | 15.74 |
| $C_4AF$ | | | | | 7.69 |

% by weight

EXAMPLE B

Preparation of Quick-Setting Cement

Various specimens of quick-setting cement were prepared, varying the following factors:
  type of setting regulator: dihydrate gypsum or anhydrite
  quicklime or slaked lime
  amount of setting regulator
  fineness Setting and mechanical strength tests were performed on mixtures of clinker ground to 3500 Blaine and refined gypsum or anhydrite. Also a set of binders were prepared, obtained by simultaneous grinding of clinker and anhydrite.

In the latter case, grinding was also performed to a higher fineness than the standard one.

EXAMPLE 4

Table 4 gives the percentage composition (as % by weight over the final mixture) grinding time, absolute gravity, and Blaine fineness of specimens prepared grinding the clinker made as described in Example 1, both as it was (Specimen 1) and grinding it together with the additives specified in Table 4 (Specimens 1A and 1B).

TABLE 4

Composition of binder in dry state

| No. | Composition % | Refining time minutes | Absolute gravity g/cm³ | Blaine cm²/g |
|---|---|---|---|---|
| 1 | 100 clinker | 19 | 3.17 | 4090 |
| 1A* | 92 clinker 4 dihydrate gypsum 4 quicklime in clods | 16 | 3.50 | 3950 |
| 1B* | 92 clinker 4 anhydrite 4 quicklime in clods | 16 | 3.16 | 4000 |

*Clinker and additives were ground together.

Specimens 1, 1A and 1B of Table 4 were converted into mortar, and the mechanical strength was measured according to the UNI EN 196.1, with the sole difference that the mortar was prepared with binder-sand ratios of 2:1 instead of 1:3 as the standard envisages. Table 5 gives the % by weight compositions of the binding mixtures converted into mortar and the results thus obtained, marking with "+" the additives added already in powder form to the mixtures of ingredients that had been ground together. Specimens 1, 1A and 1B are the same as defined in Table 4.

TABLE 5

Characteristics evaluated on mortar - 2 parts of binder:1 part of sand

| Binder mixture % | Water-binder ratio | Weight of prisms g | Compressive strength (N/mm²) | | | | |
|---|---|---|---|---|---|---|---|
| | | | 15 min | 1 h | 3 h | 24 h | 7 days |
| Specimen 1 100% | 0.285 | 568 | 1.2 | 5.6 | — | 19.4 | 27.3 |
| Specimen 1 96% + 4% chemical gypsum* | 0.295 | 566 | 1.7 | 5.5 | — | 14.1 | 27.9 |
| Specimen 1 92% + 4% chemical gypsum* 4% calcium oxide** | 0.295 | 560 | 6.3 | 7.6 | — | 19.9 | 31.5 |
| Specimen 1 90,4% + 4% chemical gypsum* 5.6% slaked lime | 0.305 | 559 | 5.4 | 8.1 | — | 13.4 | 25.2 |
| Specimen 1A 100% | 0.280 | 575 | 8.3 | 12.1 | 12.6 | 27.1 | 38.5 |
| Specimen 1B 100% | 0.280 | 577 | 7.0 | 12.1 | 12.5 | — | 34.0 |

*chemical gypsum = gypsum coming from the production of HF
**calcium oxide = quicklime powder, 90% of material passing through 90 μm, added by mixing after grinding of clinker.

RESULTS

The data given above show that the addition of lime to the binder used for the preparation of the mortar leads to a significant increase in compressive strength already at 15 minutes. The addition of slaked lime leads to an increase in compressive strength to 15 minutes but with lower values compared to quicklime (quicklime in powder form or in clods)

EXAMPLE 5

Specimens of clinker were prepared as described in Example 2, and were ground together with the ingredients specified in Table 6, for the time and to the fineness specified therein.

TABLE 6

Composition of binder in dry state

| No. | Compositon wt % | Absolute gravity g/cm³ | Blaine cm²/g |
|---|---|---|---|
| 2A* | 92% clinker 4% quicklime in clods 4% chemical gypsum | 3.10 | 4500 |
| Vicat cement | | 2.94 | 6180 |

*Clinker and additives were ground together.

The specimens thus obtained were converted into mortar, and the mechanical strength was measured according to the UNI EN 196.1, with the sole difference that the mortar was prepared with binder-sand ratios of 2:1, instead of 1:3 as the standard envisages.

The results obtained are shown in Table 7, along with the temperatures at which the mortar was prepared.

TABLE 7

Characteristics evaluated on mortar - 2 parts of binder:1 part of sand

| Mixture | Water wt % | Test temp. °C. | Life time sec. | Weight of prisms g | Compressive strength (N/mm$^2$) | | | | | | |
|---|---|---|---|---|---|---|---|---|---|---|---|
| | | | | | 15 min. | 1 h | 3 h | 4 h | 24 h | 7 days | 28 days |
| Specimen | 19 | 20 | 2.0 | 568 | 11.8 | 14.5 | — | — | 29.3 | 40.6 | 50.0 |
| 2A* | 19 | 10 | 5.30 | 573 | 9.5 | 15.1 | — | — | 28.9 | 37.9 | — |
| | 19 | 7 | 9.30 | 580 | 1.3 | 16.1 | — | — | 29.3 | 35.6 | — |
| Vicat cement | 25 | 20 | 2.0 | 520 | 5.2 | 8.2 | — | — | 12.2 | 20.1 | 23 |
| | 25 | 10 | 5.0 | 525 | 5.5 | 10.9 | — | — | 16.8 | — | — |

The percentage of water refers to the total weight of the mixture of the components of the mortar.

EXAMPLE 6

Specimens of clinker were prepared as described in Example 3, and were ground together with the ingredients indicated in Table 8, for the time and to the fineness specified therein.

TABLE 8

Composition of binder in dry state

| No. | Composition % by weight | Absolute gravity g/cm$^3$ | Blaine cm$^2$/g |
|---|---|---|---|
| 3A* | 94% clinker 2% quicklime in clods 4% dihydrate gypsum | 3.10 | 4500 |
| Vicat cement | | 2.94 | |

*Clinker and additives were ground together.

The specimens thus obtained were converted into mortar, and the mechanical strength was measured according to the UNI EN 196.1, with the sole difference that the mortar was prepared with binder-sand ratios of 2:1, instead of 1:3 as the standard envisages. The temperatures at which the mortar was prepared, as well as the results obtained, are shown in Table 9.

TABLE 9

Characteristics evaluated on mortar - 2 parts of binder:1 part of sand

| Mixture | Water wt % | Test temp. °C. | Life time sec. | Weight of prisms g | Compressive strength (N/mm$^2$) | | | | | | |
|---|---|---|---|---|---|---|---|---|---|---|---|
| | | | | | 15 min. | 1 h | 3 h | 4 h | 24 h | 7 days | 28 days |
| Specimen | 18 | 20 | 3.30 | 571 | 6.2 | 8.4 | 8.9 | 9.0 | 16.6 | 26.6 | 36 |
| 3A* | 18 | 10 | 10.0 | 577 | 5.2 | 8.9 | 10.0 | 10.0 | 13.8 | 24.7 | — |
| Vicat cement | 19 | 20 | 2.0 | 542 | 5.2 | 8.4 | 10.9 | 9.8 | 13.5 | 20.0 | 22 |

The percentage of water refers to the total weight of the mixture of the components of the mortar.

RESULTS

The data given in Tables 6, 7, 8 and 9 show that the cementitious compositions prepared with the hydraulic binder according to the present invention, assayed in the 10° C.–20° C. temperature range, show a compressive strength that is comparable to that of Prompt Vicat cement at times of 15 minutes up to approximately 4 hours, and significantly higher than that of Prompt Vicat at times of over 4 hours, and in particular markedly higher after 7 and 28 days.

I claim:

1. A dry hydraulic binder comprising: (i) a clinker containing calcium fluoro-aluminate (11 CaO.7Al$_2$O$_3$.CaF$_2$) and (ii) crude lime.

2. Hydraulic binder according to claim 1, in which the lime added to clinker ranges in quantity between 1% and 8% by weight with respect to the weight of the binder.

3. Hydraulic binder according to claim 1, in which the lime added to the clinker ranges in quantity between 3% and 6% by weight with respect to the weight of the binder.

4. Hydraulic binder according to claim 1, in which the lime added to the clinker ranges in a quantity of 4% by weight of the binder.

5. Hydraulic binder according to claim 1, in which the lime is quicklime in powder form or in clods.

6. Hydraulic binder according to claim 1, in which the lime is ground together with the clinker.

7. Hydraulic binder according to claim 1, in which the lime already ground is mixed with the clinker.

8. Hydraulic binder according to claim 1, comprising, in addition to the clinker and lime, a source of calcium sulphate.

9. Hydraulic binder according to claim 8, in which the source of calcium sulphate is selected from the group consisting of chemical gypsum and anhydrite.

10. Hydraulic binder according to claim 8, in which the calcium sulphate is added to the clinker in quantities of between 1% and 6% by weight of the binder.

11. Hydraulic binder according to claim 9, in which the chemical gypsum or anhydrite ranges in quantity between 2% and 4% by weight of the binder.

12. Hydraulic binder according to claim 1, in which the quantity of calcium fluoro-aluminate is between 1% and 30% by weight of the binder.

13. Hydraulic binder according to claim 1, in which the clinker contains, in addition to calcium fluoro-aluminate, $3CaO.SiO_2$ and $(2CaO.Fe_2O_3.6CaO.2Al_2O_3.Fe_2O_3)_{ss}$, where the subscript ss stands for "solid solution".

14. Binder according to claim 1, containing from 1% to 10% by weight of free CaO based on the total weight of the binder.

15. Binder according to claim 1, containing from 3% to 6% by weight of free CaO based on the total weight of the binder.

16. Binder according to claim 1, including:

from 1 to 30% by weight of $11CaO.7Al_2O_3.CaF_2$;

from 24 to 60% by weight of $3CaO.SiO_2$ from 15 to 30% by weight of $2CaO.SiO_2$; and from 4 to 15% by weight of $(2CaO.Fe_2O_3.6CaO.2Al_2O_3.Fe_2O_3)_{ss}$, where the subscript ss stands for "solid solution".

17. Binder according to claim 1, including:

from 10 to 18% by weight of $11CaO.7Al_2O_3.CaF_2$;

from 32 to 45% by weight of $3CaO.SiO_2$ from 20 to 30% by weight of $2CaO.SiO_2$; and from 5 to 8% by weight $(2CaO.Fe_2O_3.6CaO.2Al_2O_3.Fe_2O_3)_{ss}$ where the subscript stands for "solid solution".

18. A process for preparing the hydraulic binder described in claim 1, wherein said process comprises grinding together: (a) crude lime; (b) a clinker comprising calcium fluoro aluminate ($11\ CaO.7Al_2O_3.CaF_2$); and optionally other additives for cement.

19. Dry pre-mixture comprising a hydraulic binder as defined in claim 1.

20. A method for carrying out a building operation which comprises carrying out said building operation with a cement composition comprising a hydraulic binder as claimed in claim 1.

21. A process for preparing the hydraulic binder described in claim 1, wherein said process comprises mixing together: (a) a previously ground crude lime; (b) a previously ground clinker comprising calcium fluoro-aluminate ($11\ CaO.7Al_2O_3.CaF_2$); and optionally other additives for cement.

* * * * *

UNITED STATES PATENT AND TRADEMARK OFFICE
CERTIFICATE OF CORRECTION

PATENT NO. : 5,891,239
DATED : April 6, 1999
INVENTOR(S) : Umberto Costa It is certified that error appears in the above-identified patent and that said Letters Patent is hereby corrected as shown below:

On the title page, item [73]
Rewrite Assignee's name "Italcement" as --Italcementi--

Signed and Sealed this

Twenty-fourth Day of August, 1999

*Attest:*

Q. TODD DICKINSON

*Attesting Officer*   Acting Commissioner of Patents and Trademarks